United States Patent
Vermeersch et al.

(10) Patent No.: US 11,014,447 B2
(45) Date of Patent: May 25, 2021

(54) LOW COST STAMPED SHIFT ASSEMBLY AND STEERING COLUMN

(71) Applicant: Steering Solutions IP Holding Corporation, Saginaw, MI (US)

(72) Inventors: Michael C. Vermeersch, Essexville, MI (US); Melvin L. Tinnin, Clio, MI (US); Arthur W. Nellett, Davison, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 6 days.

(21) Appl. No.: 15/796,248

(22) Filed: Oct. 27, 2017

(65) Prior Publication Data

US 2018/0118025 A1  May 3, 2018

Related U.S. Application Data

(60) Provisional application No. 62/414,648, filed on Oct. 28, 2016.

(51) Int. Cl.
| | |
|---|---|
| *F16H 61/36* | (2006.01) |
| *B60K 20/06* | (2006.01) |
| *F16H 59/02* | (2006.01) |
| *F16H 59/10* | (2006.01) |
| *F16C 1/10* | (2006.01) |
| *F16H 61/24* | (2006.01) |
| *B62D 1/187* | (2006.01) |

(52) U.S. Cl.
CPC ............... *B60K 20/06* (2013.01); *F16C 1/10* (2013.01); *F16H 59/0278* (2013.01); *F16H 59/10* (2013.01); *F16H 61/24* (2013.01); *F16H 61/36* (2013.01); *B62D 1/187* (2013.01); *F16H 2061/242* (2013.01); *F16H 2061/247* (2013.01)

(58) Field of Classification Search
CPC ....... B60K 20/06; F16C 1/10; F16H 59/0278; F16H 59/10; F16H 61/24; F16H 61/36; F16H 2061/242; B62D 1/187
USPC ....................................................... 74/473.31
See application file for complete search history.

(56) References Cited

U.S. PATENT DOCUMENTS

| | | | | |
|---|---|---|---|---|
| 3,049,023 A | * | 8/1962 | McCordic | F16H 63/3009 74/484 R |
| 3,550,551 A | * | 12/1970 | Miller | F16H 63/42 116/28.1 |
| 3,942,614 A | * | 3/1976 | Thompson | B60T 11/103 192/220.2 |
| 4,096,930 A | * | 6/1978 | Viscardi | B60T 11/103 180/271 |
| 4,901,592 A | * | 2/1990 | Ito | B62D 1/195 188/371 |

(Continued)

*Primary Examiner* — Jake Cook
*Assistant Examiner* — T. Scott Fix
(74) *Attorney, Agent, or Firm* — Dickinson Wright PLLC

(57) ABSTRACT

A steering column assembly that includes an upper jacket and a gear shift assembly. The upper jacket extends along a steering column axis. The gear shift assembly includes a shift assembly bracket and shift shaft assembly. The shift assembly bracket has a column mounting portion that is operatively connected to the upper jacket and a cradle portion extends from the column mounting portion. The cradle portion has a first sidewall and a second sidewall each extending from a base. The shift shaft assembly extends at least partially through the first sidewall and the second sidewall.

8 Claims, 9 Drawing Sheets

(56) References Cited

U.S. PATENT DOCUMENTS

| | | | |
|---|---|---|---|
| 5,022,504 A * | 6/1991 | Kobayashi | B60K 20/06 192/220.2 |
| 5,027,931 A * | 7/1991 | Ratke | F16H 59/10 192/220.2 |
| 5,729,187 A * | 3/1998 | Moody | F16H 61/22 192/218 |
| 6,327,928 B1 * | 12/2001 | Bowerman | B60K 20/06 74/473.15 |
| 6,447,867 B1 | 9/2002 | Kominami et al. | |
| 7,137,499 B2 | 11/2006 | Riefe et al. | |
| 7,621,047 B2 | 11/2009 | Vermeersch | |
| 7,749,135 B2 | 7/2010 | Vermeersch et al. | |
| 7,971,502 B2 | 7/2011 | Vermeersch | |
| 8,113,081 B2 * | 2/2012 | Reppuhn | F16H 59/10 74/473.15 |
| 8,602,194 B2 | 12/2013 | Vermeersch | |
| 8,677,851 B2 | 3/2014 | Vermeersch | |
| 8,695,204 B2 | 4/2014 | Vermeersch | |
| 8,857,851 B2 * | 10/2014 | Clark | B60K 20/06 280/775 |
| 9,157,522 B2 | 10/2015 | Vermeersch et al. | |
| 9,162,415 B2 | 10/2015 | Vermeersch | |
| 9,447,866 B2 | 9/2016 | Vermeersch et al. | |
| 2001/0022111 A1 * | 9/2001 | Ritchie | B60K 20/06 74/473.31 |
| 2011/0252911 A1 * | 10/2011 | Kobayashi | B60K 20/06 74/473.31 |

\* cited by examiner

LOW COST STAMPED SHIFT ASSEMBLY AND STEERING COLUMN

CROSS-REFERENCES TO RELATED APPLICATIONS

This patent application claims priority to U.S. Provisional Patent Application Ser. No. 62/414,648, filed Oct. 28, 2016, which is incorporated herein by reference in its entirety.

BACKGROUND

Vehicles are provided with a shift assembly that is operable to select or shift gears of a vehicle transmission. The shift assembly may be mounted to a vehicle steering column and is operatively connected to the vehicle transmission through a control mechanism. The shift assembly may contain numerous cast and machined components that add significant cost and size to the shift system.

Accordingly, it is desirable to provide a steering column with a lower-profile and lower parts count shift assembly that lower cost of the shift assembly, while improving the performance of the shift assembly.

SUMMARY

Disclosed is a steering column assembly that includes an upper jacket and a gear shift assembly. The upper jacket extends along a steering column axis. The gear shift assembly includes a shift assembly bracket and shift shaft assembly. The shift assembly bracket has a column mounting portion that is operatively connected to the upper jacket and a cradle portion extends from the column mounting portion. The cradle portion has a first sidewall and a second sidewall each extending from a base. The shift shaft assembly extends at least partially through the first sidewall and the second sidewall.

In addition to one or more of the features described herein, the shift shaft assembly is spaced apart from the base.

In addition to one or more of the features described herein, the first sidewall extends from an end of the column mounting portion.

In addition to one or more of the features described herein, the shift assembly bracket includes a cable mounting portion that extends from the second sidewall.

In addition to one or more of the features described herein, the shift assembly bracket includes an arm that extends from the base.

In addition to one or more of the features described herein, the shift assembly bracket defines a bore proximate a junction between the arm and the base.

In addition to one or more of the features described herein, the column mounting portion includes an angled tab that is disposed parallel to the arm.

In addition to one or more of the features described herein, the shift shaft assembly includes a shifter cup that is disposed adjacent to the first sidewall and a shaft member that extends between the first sidewall and the second sidewall.

In addition to one or more of the features described herein, the shifter cup is operatively connect the shaft member by a shaft bolt that extends through the shifter cup and the shaft member.

In addition to one or more of the features described herein, the shifter cup includes a cup base defining an opening through which the shaft bolt extends and first and second curved sidewalls extending from the cup base.

Also disclosed is a gear shift assembly that is provided with a steering column assembly. The gear shift assembly includes a shift assembly bracket and a shift shaft assembly. The shift assembly bracket includes a column mounting portion; a cradle portion having a base, a first sidewall that extends from the column mounting portion and the base, and a second sidewall extending from the base; and a cable mounting portion extending from the second sidewall. The shift shaft assembly includes a shaft member that extends through the first sidewall and the second sidewall; and a shifter cup disposed adjacent to the first sidewall.

In addition to one or more of the features described herein, the shaft member includes a flange that is disposed about a first end of the shaft member.

In addition to one or more of the features described herein, the flange abuts the first sidewall.

In addition to one or more of the features described herein, the shifter cup includes a cup base defining an opening, a first sidewall extending from the cup base, and second curved sidewalls extending from the cup base.

In addition to one or more of the features described herein, at least one of the first sidewall and the second sidewall define an outwardly extending ear.

In addition to one or more of the features described herein, a shift gate operatively connected to the column mounting portion and defining a shift gate opening defining a plurality of detents.

In addition to one or more of the features described herein, a clevis that is at least partially received by the shifter cup and extends through the shift gate opening.

In addition to one or more of the features described herein, a safety switch bracket that is operatively connected to the column mounting portion and engages the shift gate.

In addition to one or more of the features described herein, the shift gate includes a tab that defines a mounting hole.

In addition to one or more of the features described herein, the safety switch bracket defines a bore that is aligned with the mounting hole.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
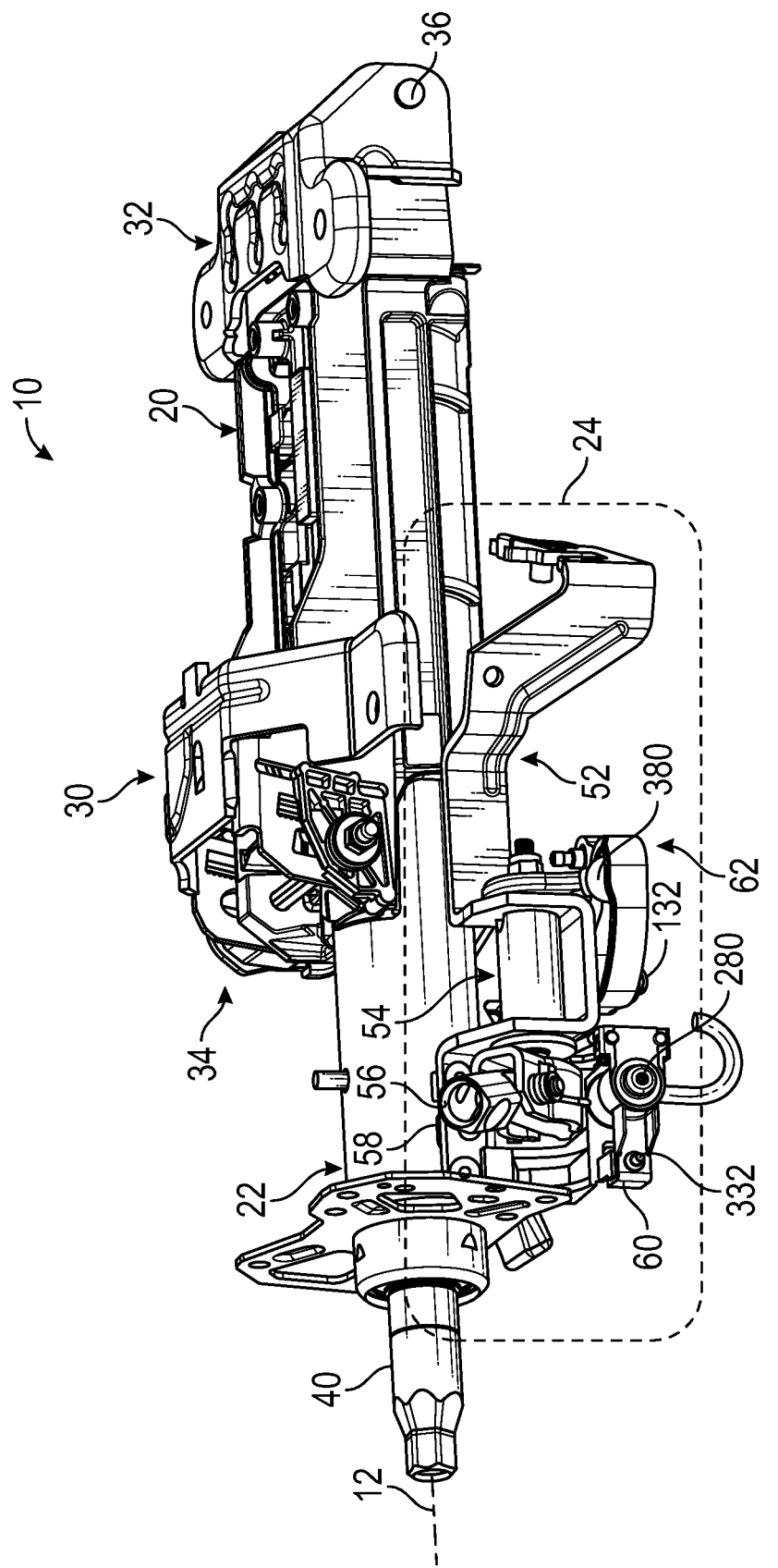
FIG. 1 is a perspective view of a steering column assembly having a shift assembly.

Referring now to the Figures, where the present disclosure will be described with reference to specific embodiments, without limiting same, and like reference numerals refer to like elements in the several views, including prime reference numerals that also include an apostrophe where the reference with an apostrophe is used designate an element in a different embodiment.

Referring to FIG. 1, a steering column assembly 10 is shown. The steering column assembly 10 extends along a steering column axis 12. The steering column assembly 10 is the extensible or retractable along the steering column axis 12. The steering column assembly 10 is pivotable, tiltable, or rake adjustable about a tilt axis or pivot axis disposed substantially transverse to the steering column axis 12. The steering column assembly 10 includes a lower jacket 20, an upper jacket 22, and a gear shift assembly 24.

The lower jacket 20 extends along the steering column axis 12. The lower jacket 20 is operatively connected to a vehicle structure by a column mounting assembly having a first mounting bracket 30 and a second mounting bracket 32. The first mounting bracket 30 may be disposed over or about a rake adjustment assembly 34 that enables the lower jacket 20 and the upper jacket 22 to be tiltable or pivotable relative to the first mounting bracket 30. The second mounting bracket 32 may be axially spaced apart from the first mounting bracket 30, relative to the steering column axis 12. The second mounting bracket 32 and the lower jacket 20 may at least partially define a pivot 36 about which the lower jacket 20 may pivot about during a rake adjustment of the steering column assembly 10.

The upper jacket 22 extends longitudinally along the steering column axis 12. The upper jacket 22 is at least partially received within the lower jacket 20 and is extensible, retractable, or collapsible along the steering column axis 12 relative to the lower jacket 20.

A steering shaft 40 may extend through the lower jacket 20 and the upper jacket 22 along the steering column axis 12. The steering shaft 40 is rotatable about the steering column axis 12 responsive to an input provided by a hand wheel and/or by an advanced driver assist system that may perform certain vehicle movements or maneuvers without continuous driver input. The steering shaft 40 may translate, tilt, or pivot along with the lower jacket 20 and the upper jacket 22.

The gear shift assembly 24 is operatively connected to at least one of the upper jacket 22 or the lower jacket 20. As shown in FIG. 1, the gear shift assembly 24 is operatively connected to the upper jacket 22.

Figure 2:
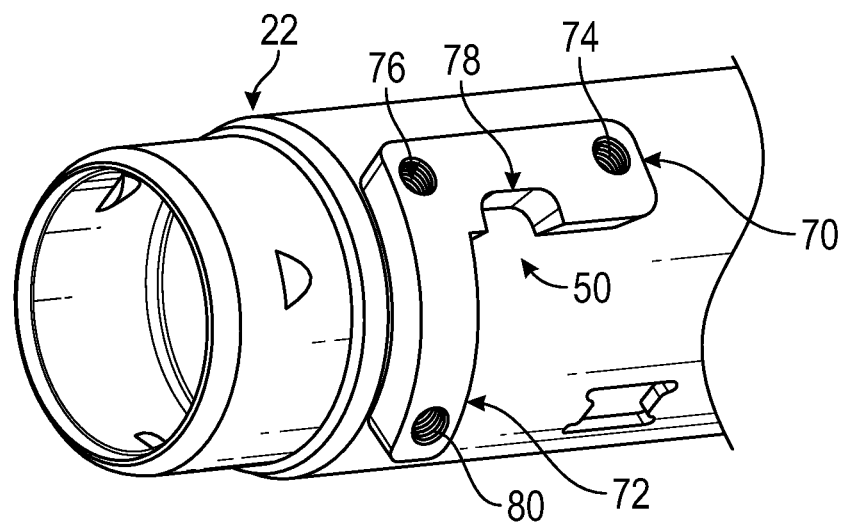
FIG. 2 is a perspective view of a jacket having a L-shaped column bracket as disclosed herein.
Figure 3:
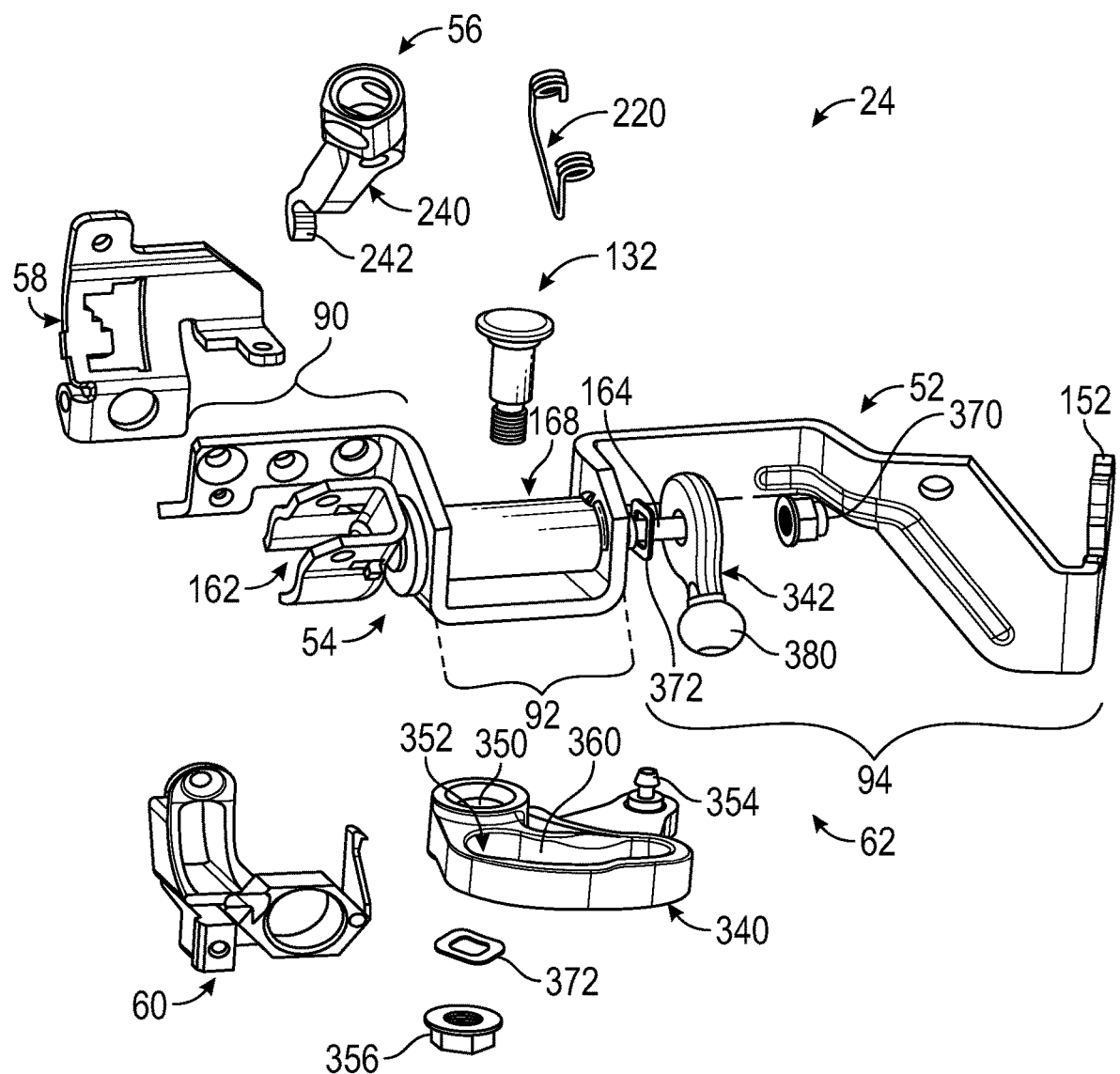
FIG. 3 is a partially disassembled view of the shift assembly.

Referring to FIGS. 1-3, the gear shift assembly includes a jacket mounting bracket 50, a shift assembly bracket 52, a shift shaft assembly 54, a shift clevis 56, a shift gate 58, a safety switch bracket 60, and a ball actuator assembly 62.

Referring to FIG. 2, the jacket mounting bracket 50 is disposed on the upper jacket 22. The jacket mounting bracket 50 is operatively connected to the shift assembly bracket 52, the shift gate 58, and the safety switch bracket 60.

The jacket mounting bracket 50 includes a first mounting bracket portion 70 and a second mounting bracket portion 72 providing the jacket mounting bracket 50 with a substantially L-shaped configuration. The first mounting bracket portion 70 is disposed substantially parallel to the steering column axis 12 and the second mounting bracket portion 72 is disposed substantially perpendicular to the steering column axis 12.

The first mounting bracket portion 70 defines a first mounting hole 74, a second mounting hole 76, and a notch 78. The first mounting hole 74 and the second mounting hole 76 are spaced apart from each other and extend through the first mounting bracket portion 70. The notch 78 is disposed between the first mounting hole 74 and the second mounting hole 76. The notch 78 extends from a first side of the first mounting bracket portion 70 towards a second side of the first mounting bracket portion 70.

The second mounting bracket portion 72 extends from and is disposed substantially perpendicular to the first mounting bracket portion 70. The second mounting bracket portion 72 defines a third mounting hole 80.

Figure 4:
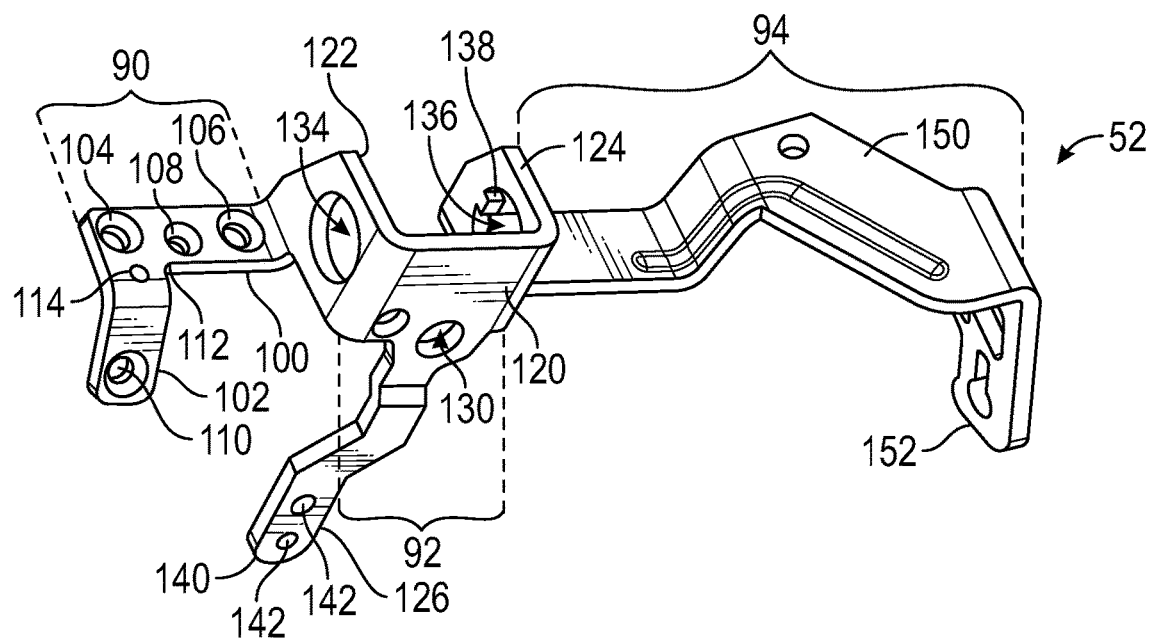
FIG. 4 is a first perspective view of a shift assembly bracket of the shift assembly.
Figure 5:
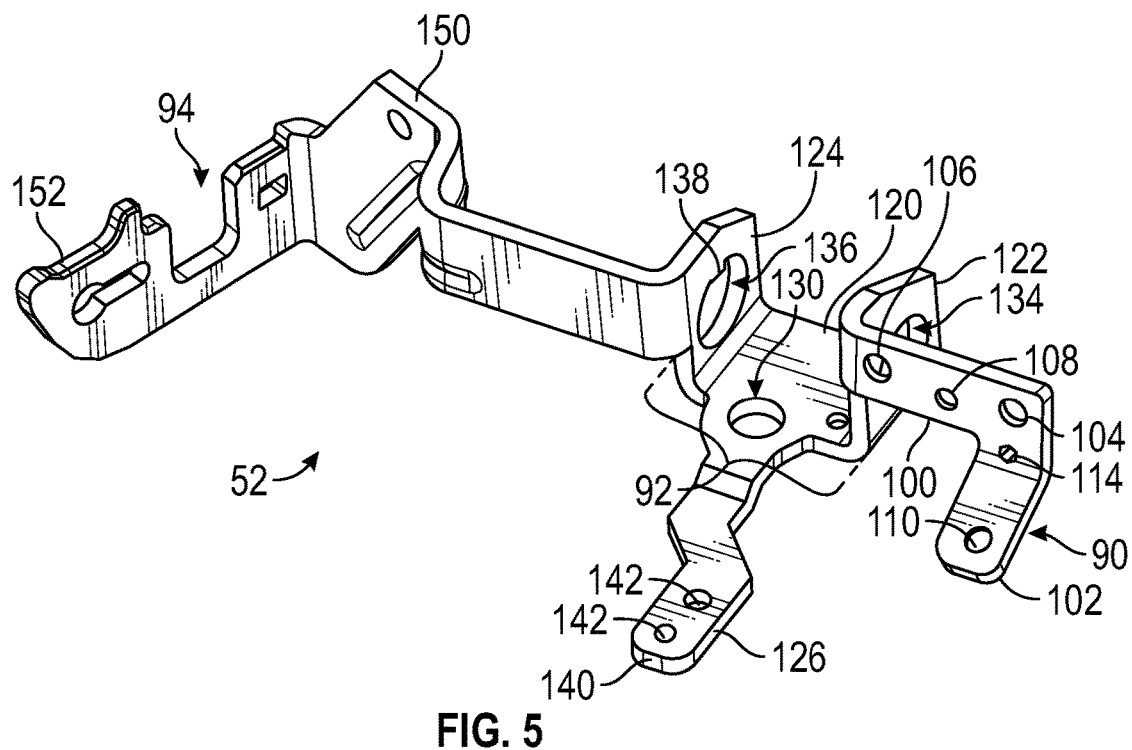
FIG. 5 is a second perspective view of the shift assembly bracket.

Referring to FIGS. 3-5, the shift assembly bracket 52 may be a stamped metal bracket having a column mounting portion 90, a cradle portion 92, and a cable mounting portion 94.

The column mounting portion 90 includes a generally flat planar section 100 and a downwardly protruding and angled tab 102 that extends from an end of the generally flat planar section 100. The generally flat planar section 100 is operatively connected to the first mounting bracket portion 70 and the downwardly protruding and angled tab 102 is operatively connected to the second mounting bracket portion 72. The generally flat planar section 100 defines a first bracket mounting hole 104, a second bracket mounting hole 106, and a shift gate mounting hole 108 that is disposed between the first bracket mounting hole 104 and the second bracket mounting hole 106. The angled tab 102 defines a third bracket mounting hole 110. In at least one embodiment, proximate a junction 112 between the generally flat planar section 100 and the angled tab 102, a threaded bore or threaded opening 114 may be defined.

The cradle portion 92 extends between the cable mounting portion 94 and the cable mounting portion 94. The cradle portion 92 is generally U-shaped and is arranged to receive at least a portion of the shift shaft assembly 54, as shown in FIG. 5. The cradle portion 92 includes a base 120, a first sidewall 122 extending from a first side of the base 120, a second sidewall 124 extending from a second side of the base 120, and an arm 126 extending from the base 120.

The base 120 defines a bore 130 that is arranged to receive a shoulder bolt 132 that extends into a component of the ball actuator assembly 62. The first sidewall 122 is disposed substantially perpendicular to and extends from a first side of the base 120. The first sidewall 122 defines a first curved sidewall opening 134. The flat planar section 100 of the column mounting portion 90 extends from and is disposed substantially perpendicular to the first sidewall 122.

The second sidewall 124 is disposed substantially perpendicular to and extends from a second side of the base 120. The second sidewall 124 defines a second curved sidewall opening 136 that is proximately aligned with the first curved sidewall opening 134. The second curved sidewall opening 136 includes a protrusion 138. The shift shaft assembly 54 extends through or into the first curved sidewall opening 134 and the second curved sidewall opening 136 to operatively connect the shift shaft assembly 54 to the cradle portion 92, as shown in FIG. 3. The cable mounting portion 94 extends from and is disposed substantially perpendicular to the second sidewall 124.

The arm 126 extends from the base 120 and is disposed between and spaced apart from the first sidewall 122 and the second sidewall 124. The arm 126 may include one or more chamfers or bends. A distal end 140 of the arm 126 defines at least one opening 142 that is arranged to receive a fastener properly connect the arm 126 to the upper jacket 22.

The cable mounting portion 94 extends from the second sidewall 124 of the cradle portion 92. The cable mounting portion 94 includes an angled portion 150 and a cable cradle portion 152. The angled portion 150 is disposed between a generally planar portion of the cable mounting portion 94 and the cable cradle portion 152. The cable cradle portion 152 receives a portion of a transmission shift cable assembly or control mechanism that extends towards a transmission.

Referring to FIGS. 3, 6A, 6B, and 7, the shift shaft assembly 54 is received by the cradle portion 92 of the shift assembly bracket 52. The shift shaft assembly 54 includes a shaft member 160, a shifter cup 162, and a shaft bolt 164 that extends through the shaft member 160 and the shifter cup 162.

The shaft member 160 may be configured as a medal bushing or sleeve. The shaft member 160 includes a hollow body 170 and the flange 172.

The hollow body 170 extends between a first end 174 and a second end 176 along an axis 178 that is disposed substantially parallel to the steering column axis 12. The hollow body 170 extends into the first curved sidewall opening 134 and the second curved sidewall opening 136 and engages respective interior surfaces of the openings. The hollow body 170 is joined to the cradle portion 92. The protrusion 138 of the second curved sidewall opening 136 engages an outer surface of the hollow body 170 of the shaft member 160 to aid in retaining the shaft member 160 within the second curved sidewall opening 136. In at least one embodiment, the hollow body 170 defines a notch or a recess 180 that extends from the second end 176 towards the first end 174.

The flange 172 is disposed about the first end 174 of the hollow body 170 and engages the first sidewall 122 of the cradle portion 92.

The shifter cup 162 is disposed adjacent to the shaft member 160. The shifter cup 162 includes a cup base 190, a first curved sidewall 192 extending from the cup base 190, and a second curved sidewall 194 extending from the cup base 190.

The cup base 190 defines an opening 200 that extends along the axis 178. The shaft bolt 164 extends through the opening 200 and may engage a generally straight or flat edge 202 of the opening 200 that is configured as a non-rotation feature that inhibits rotation of the shaft bolt 164 relative to the shifter cup 162.

The first curved sidewall 192 is disposed substantially perpendicular to and extends from a first side of the cup base 190. The first curved sidewall 192 defines a first curved sidewall opening 210 and an outwardly extending first tab or first ear 212.

The second curved sidewall 194 is spaced apart from the first curved sidewall 192 and is disposed substantially perpendicular to and extends from a second side of the cup base 190. The second curved sidewall 194 defines a second curved sidewall opening 214 and an outwardly extending second tab or second ear 216. The second curved sidewall opening 214 and the first curved sidewall opening 210 are proximately aligned with each other.

Figure 6A:
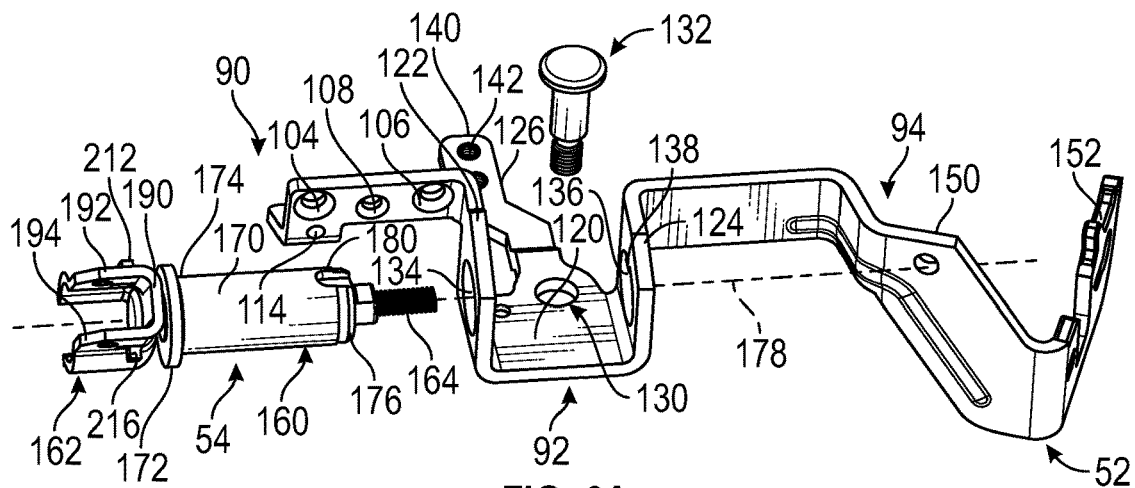
FIG. 6A is a perspective view of a shift shaft assembly relative to the shift assembly bracket.
Figure 6B:
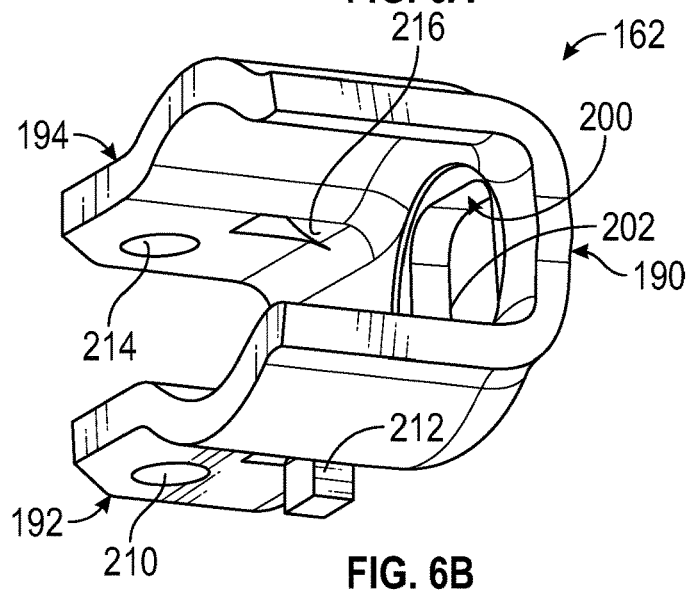
FIG. 6B is a perspective view of a first embodiment of a shifter cup.
Figure 6C:
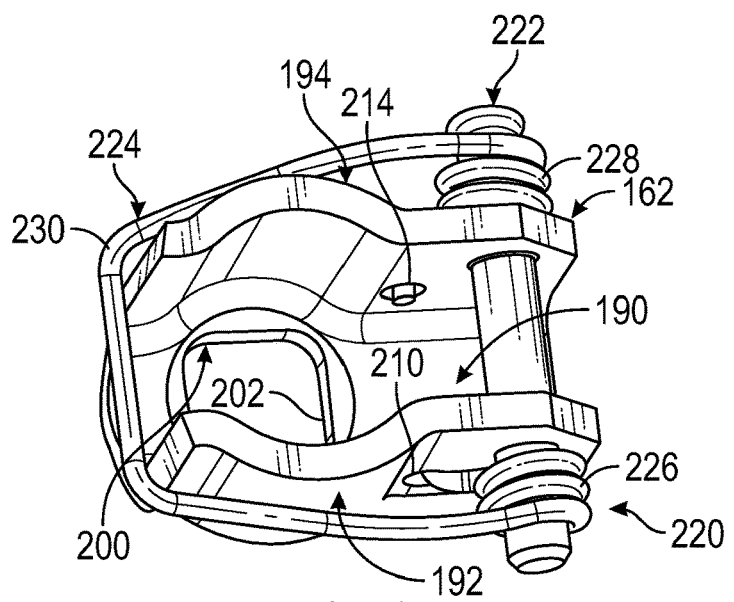
FIG. 6C is a perspective view of a second embodiment of a shifter cup.

Referring to FIGS. 1, 3, and 6C, a spring assembly 220 is operatively connected to the shifter cup 162. The spring assembly 220 includes a pin 222 and a biasing member 224. The pin 222 extends through the first curved sidewall opening 210 and the second curved sidewall opening 214. The biasing member 224 includes a first end 226, a second end 228, and a biasing member body 230 that extends between the first end 226 and the second end 228. The first end 226 is disposed about a first portion of the pin 222 and is disposed adjacent to the first curved sidewall 192. A portion of the first end 226 of the biasing member 224 engages the first tab or first ear 212. The second end 228 is disposed about a second portion of the pin 222 and is disposed adjacent to the second curved sidewall 194. A portion of the second end 228 of the biasing member 224 engages the second tab or second ear 216. The biasing member body 230 extends about a portion of the shifter cup 162 and is arranged to apply a preload to the shift clevis 56.

Figure 7:
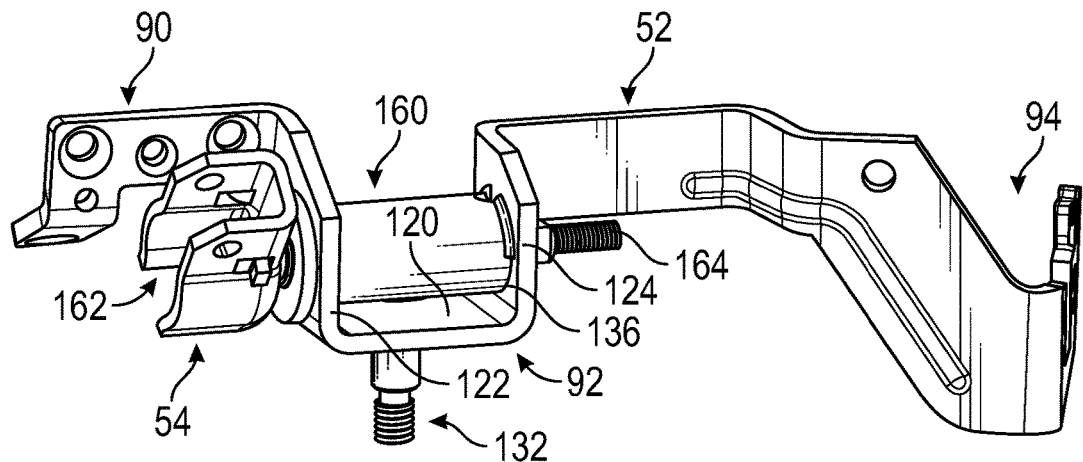
FIG. 7 is a first perspective view of the shift assembly assembled with the shift assembly bracket.
Figure 8:
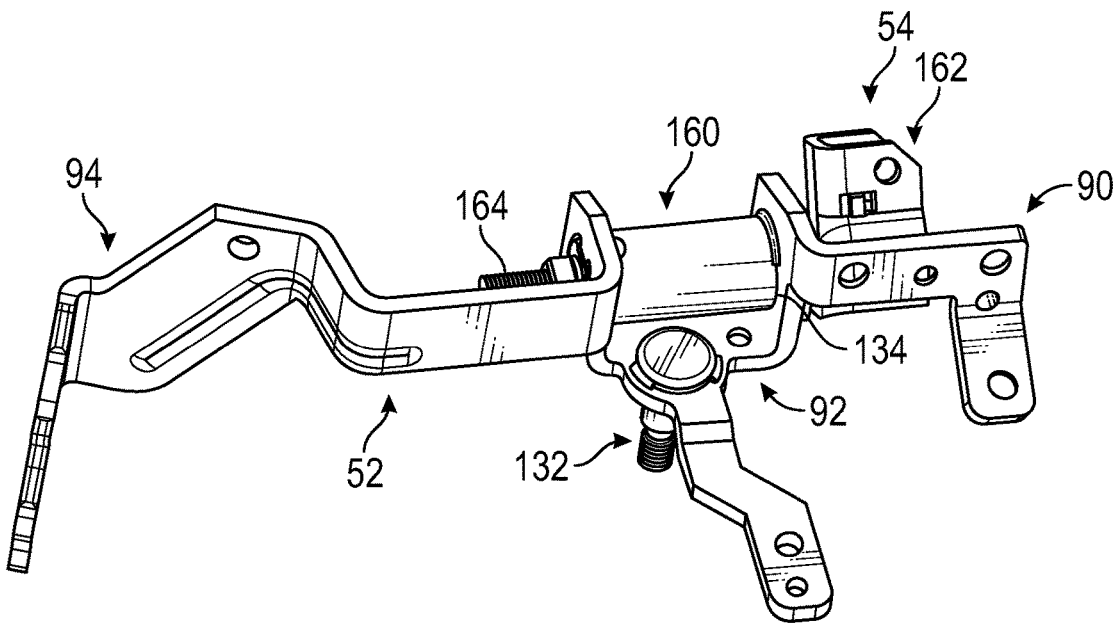
FIG. 8 is a second perspective view of the shift assembly assembled with the shift assembly bracket.

Referring to FIGS. 7 and 8, the shift shaft assembly 54 is rotatably positioned within the first curved sidewall opening 134 and the second curved sidewall opening 136 of the cradle portion 92. Furthermore, the shoulder bolt 132 extends through the bore 130 of the cradle portion 92.

Referring to FIG. 3, the shift clevis 56 is at least partially received by the shifter cup 162 of the shift shaft assembly 54. The shift clevis 56 may extend through open ends of the shifter cup 162 that are defined by the cup base 190, the first curved sidewall 192, and the second curved sidewall 194. A shift lever extends into and is operatively connected to the shift clevis 56.

The shift clevis 56 includes a pawl or an arm 240 having a tip 242 that extends through the shift gate 58. The biasing member 224 of the spring assembly 220 biases the arm 240 having the tip 242 of the shift clevis 56 against a surface of the shift gate 58 that corresponds to a gear selection (e.g., P, R, N, D, or L) of the transmission.

The rotation of the shift lever and the shift clevis 56 rotates the shift shaft assembly 54 about the axis 178 to cause movement of the ball actuator assembly 62 to move a transmission shift cable or a control mechanism towards or from a gear selection.

Figure 9:
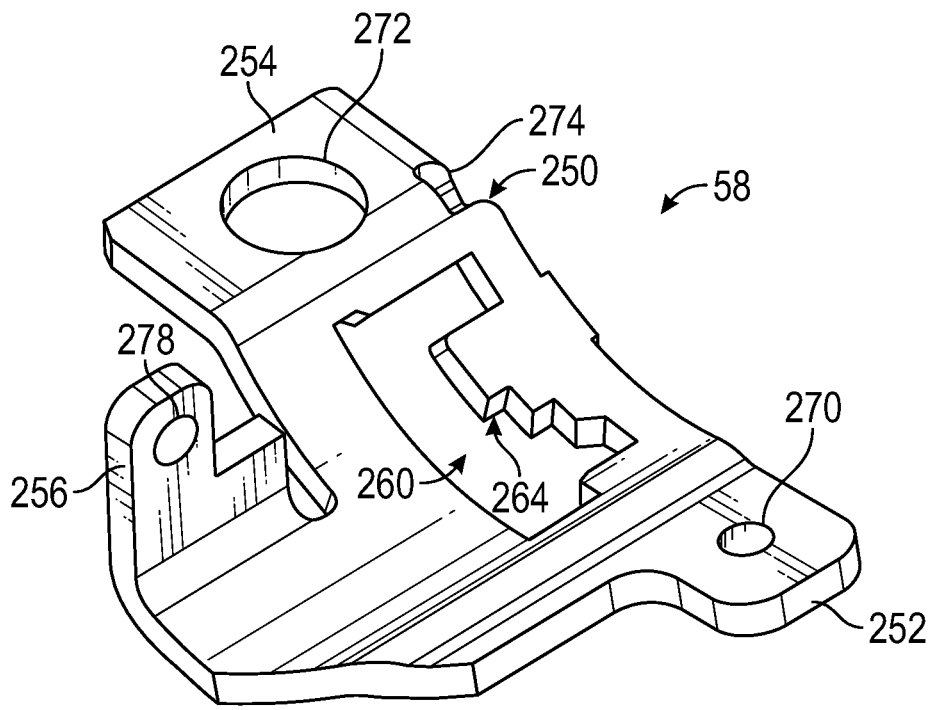
FIG. 9 is a first perspective view of a first embodiment of a shift gate of the shift assembly.
Figure 10:
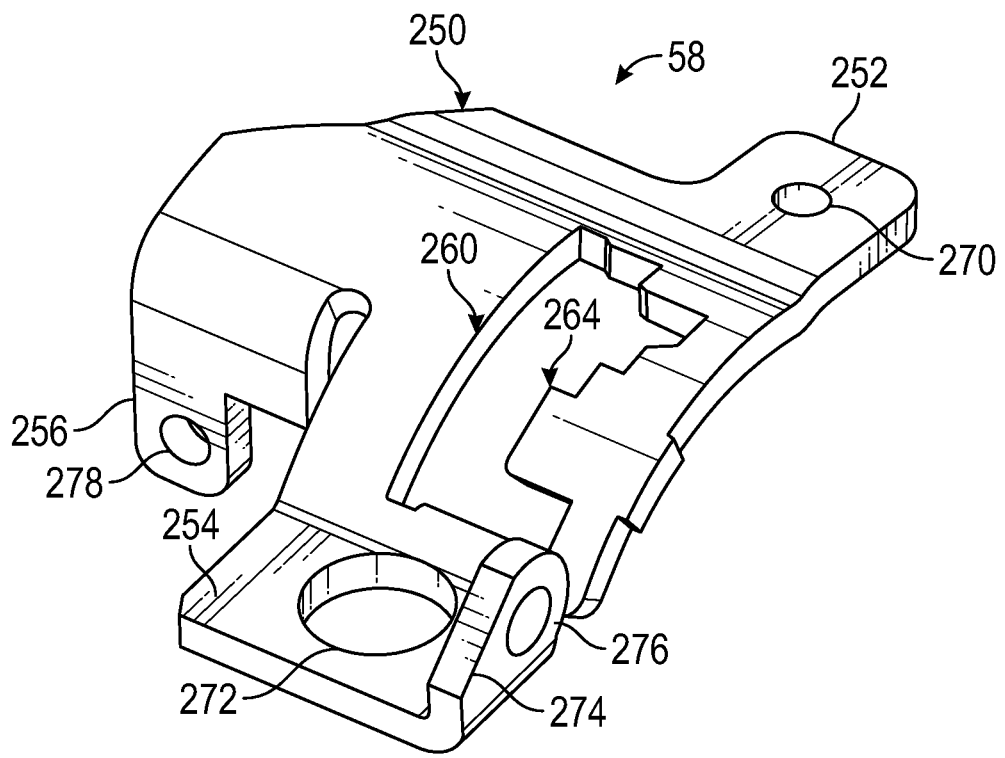
FIG. 10 is a second perspective view of the first embodiment of the shift gate of FIG. 9.

Referring to FIGS. 3, 9, and 10, the shift gate 58 is operatively connected to the first mounting bracket portion 70 and the column mounting portion 90 of the shift assembly bracket 52. The shift gate 58 may be a stamped metal shift gate that includes a shift gate body 250, a first tab 252, a second tab 254, and a third tab 256.

The shift gate body 250 defines a shift gate opening 260 that is disposed between the first tab 252 and the second tab 254. The shift gate opening 260 is provided with a plurality of detents 264 that correspond to a gear selection of the transmission. The arm 240 having the tip 242 of the shift clevis 56 may be biased against or may engage a detent of the plurality of detents 264 based on the position of the shift lever and the shift clevis 56. The arm 240 having the tip 242 of the shift clevis 56 may be moved away from engagement from a detent of the plurality of detents 264 of the shift gate 58 responsive to angulation of the shift lever and the shift clevis 56.

The first tab 252 extends from the shift gate body 250 and engages the first mounting bracket portion 70 and the column mounting portion 90. The first tab 252 defines a first mounting opening 270 that receives a fastener that extends through the shift gate mounting hole 108 of the column mounting portion 90.

The second tab 254 is disposed opposite the first tab 252. The second tab 254 is angled such that is disposed substantially non-perpendicular and nonparallel with the shift gate body 250. The second tab 254 defines a second mounting hole 272 that is arranged to receive a brake transmission shift interlock (BTSI) 280, as shown in FIG. 1. The tip 242 of the arm 240 of the shift clevis 56 may selectively engage a portion of the BTSI 280 based on a position of the shift lever and the shift clevis 56.

In at least one embodiment, the second tab 254 may include a locator tab 274 that is disposed substantially perpendicular to the second tab 254. The locator tab 274 may define another mounting hole 276.

The third tab 256 is spaced apart from the first tab 252 and the second tab 254. The third tab 256 is disposed generally perpendicular to the shift gate body 250 and extends towards the shift clevis 56. The third tab 256 defines a third mounting hole 278.

Figure 11:
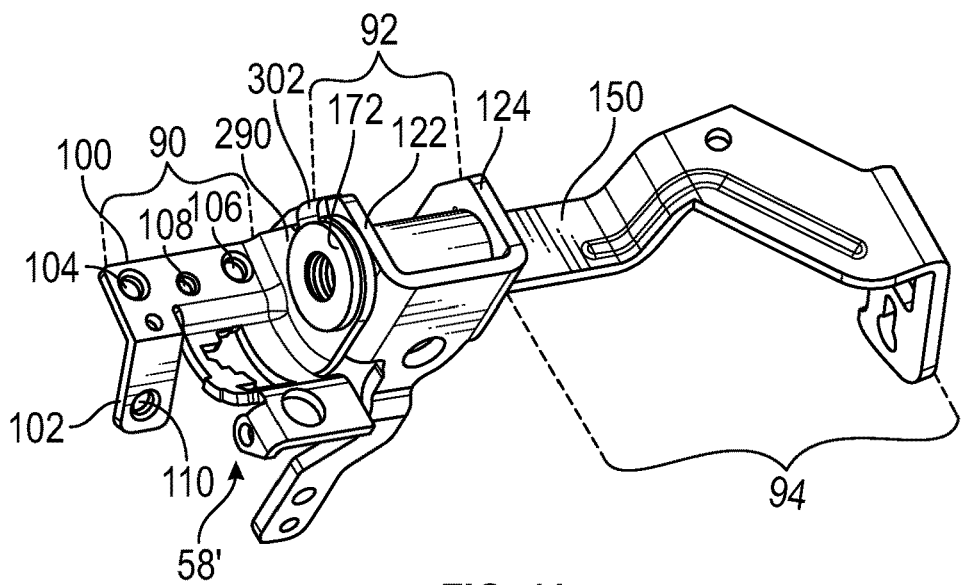
FIG. 11 is a perspective view of second embodiments of a shift bracket and shift gate as disclosed herein.
Figure 12:
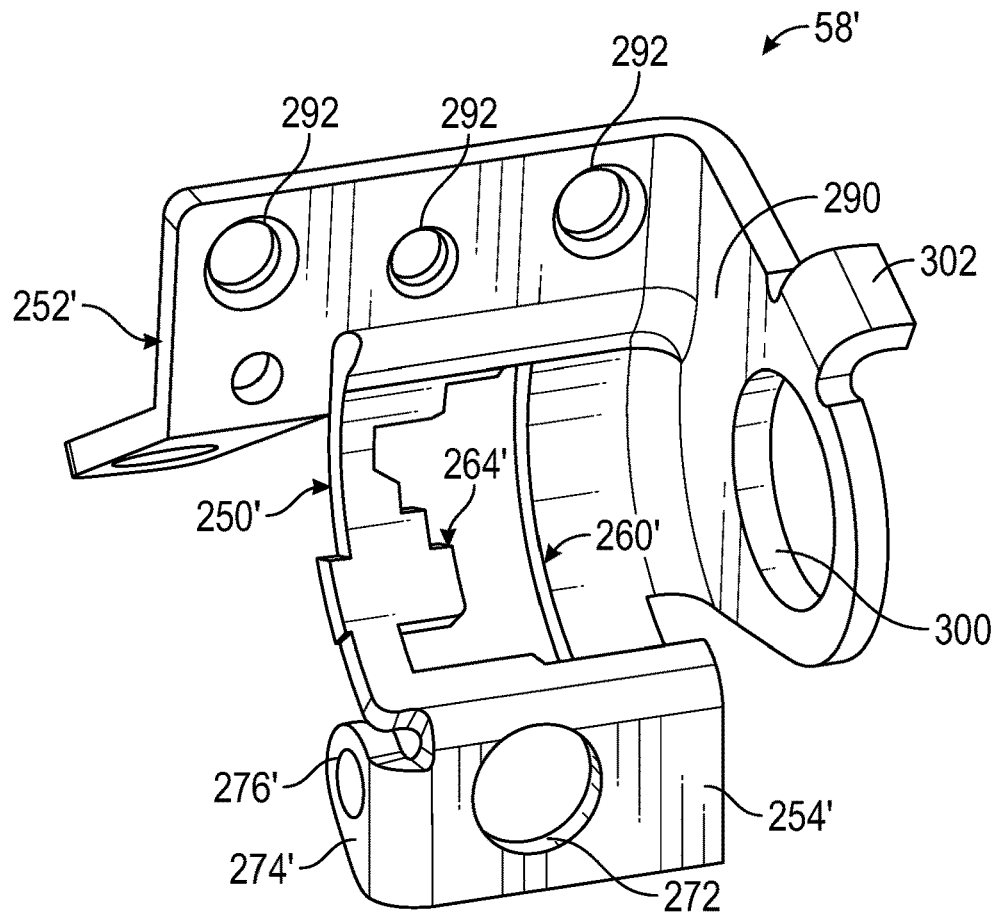
FIG. 12 is a perspective view of the second embodiment of the shift gate of FIG. 11.

Referring to FIGS. 11 and 12, a second embodiment of the shift gate 58' is shown. The shift gate 58' includes a shift gate body 250', a first tab 252', a second tab 254', a third tab 256', and a mounting tab 290.

The shift gate body 250' defines a shift gate opening 260' that is disposed between the first tab 252' and the second tab 254'. The shift gate opening 260' is provided with a plurality of detents 264' that correspond to the gear selection of the transmission. The arm 240 having the tip 242 of the shift clevis 56 may be biased against or may engage a detent of the plurality of detents 264' based on the position of the shift lever. The arm 240 having the tip 242 of the shift clevis 56 may be moved away from engagement from a detent of the plurality of detents 264 of the shift gate 58' responsive to angulation of the shift lever and the shift clevis 56.

The first tab 252' extends from the shift gate body 250' and engages the first mounting bracket portion 70 and the column mounting portion 90. The first tab 252' may be elongated such that it defines a plurality of openings 292. The plurality of openings 292 includes a first opening that is proximately aligned with the first bracket mounting hole 104 of the column mounting portion 90, a second opening that is proximately aligned with the second bracket mounting hole 106, and a third opening that is proximately aligned with the shift gate mounting hole 108. The plurality of openings 292 are each arranged to receive a fastener to couple the first tab 252' to the column mounting portion 90.

The second tab 254' is disposed opposite the first tab 252'. The second tab 254' is angled such that is disposed substantially non-perpendicular and nonparallel with the shift gate body 250'. The second tab 254' defines a second mounting hole 272' that is arranged to receive a brake transmission shift interlock (BTSI) 280, as shown in FIG. 1. The tip 242 of the arm 240 of the shift clevis 56 may selectively engage a portion of the BTSI 280 based on a position of the shift lever and the shift clevis 56.

In at least one embodiment, the second tab 254' may include a locator tab 274' that is disposed substantially perpendicular to the second tab 254'. The locator tab 274' may define another mounting hole 276'.

The third tab 256' is spaced apart from the first tab 252', the second tab 254', and the mounting tab 290. The third tab 256' is disposed generally perpendicular to the shift gate body 250' and extends towards the shift clevis 56. The third tab 256' defines a third mounting hole 278'.

The mounting tab 290 extends from the shift gate body 250' and defines a receiving opening 300 and an anti-rotation feature 302. The mounting tab 290 engages the first sidewall 122 and the receiving opening 300 is proximately aligned with the first curved sidewall opening 134. The shaft member 160 of the shift shaft assembly 54 extends through the receiving opening 300, the first curved sidewall opening 134, and the second curved sidewall opening 136. The flange 172 engages a portion of the mounting tab 290. The anti-rotation feature 302 extends from the mounting tab 290 and engages the first sidewall 122 to inhibit relative movement between the shift gate 58' and the cradle portion 92 of the shift assembly bracket 52.

Figure 13:
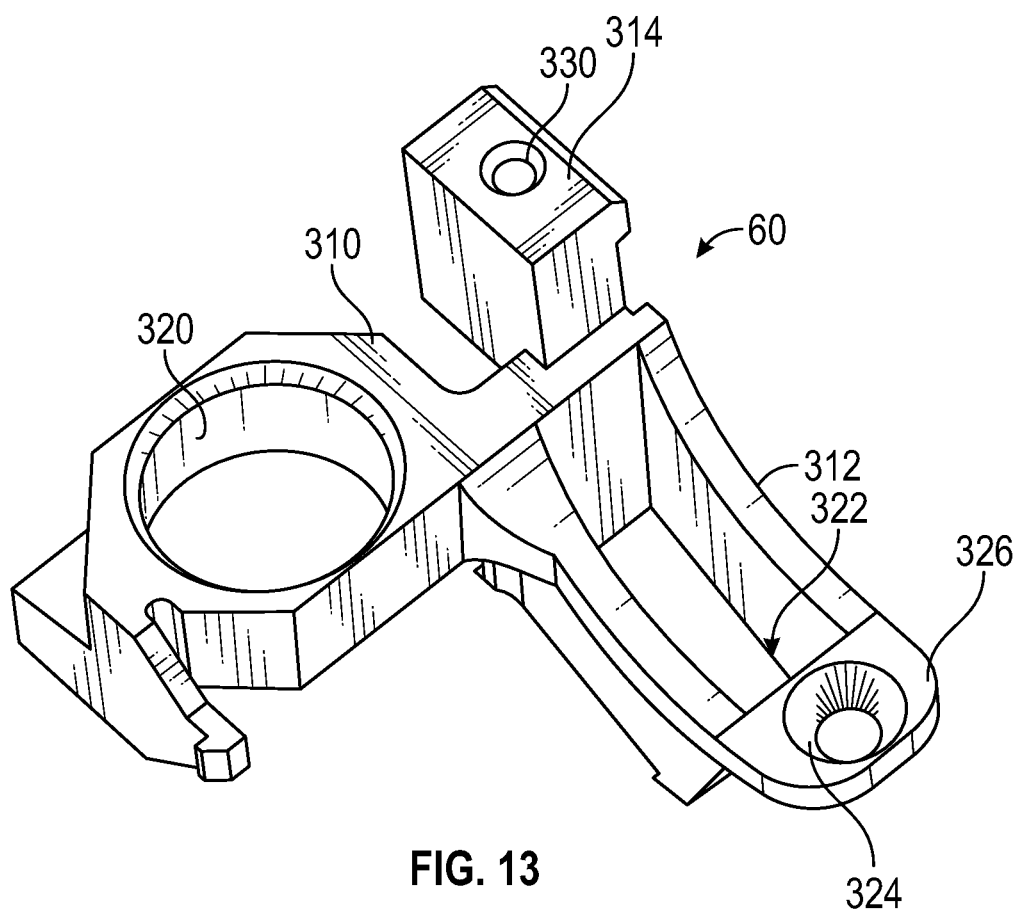
FIG. 13 is a first perspective view of a safety switch bracket of the shift assembly.
Figure 14:
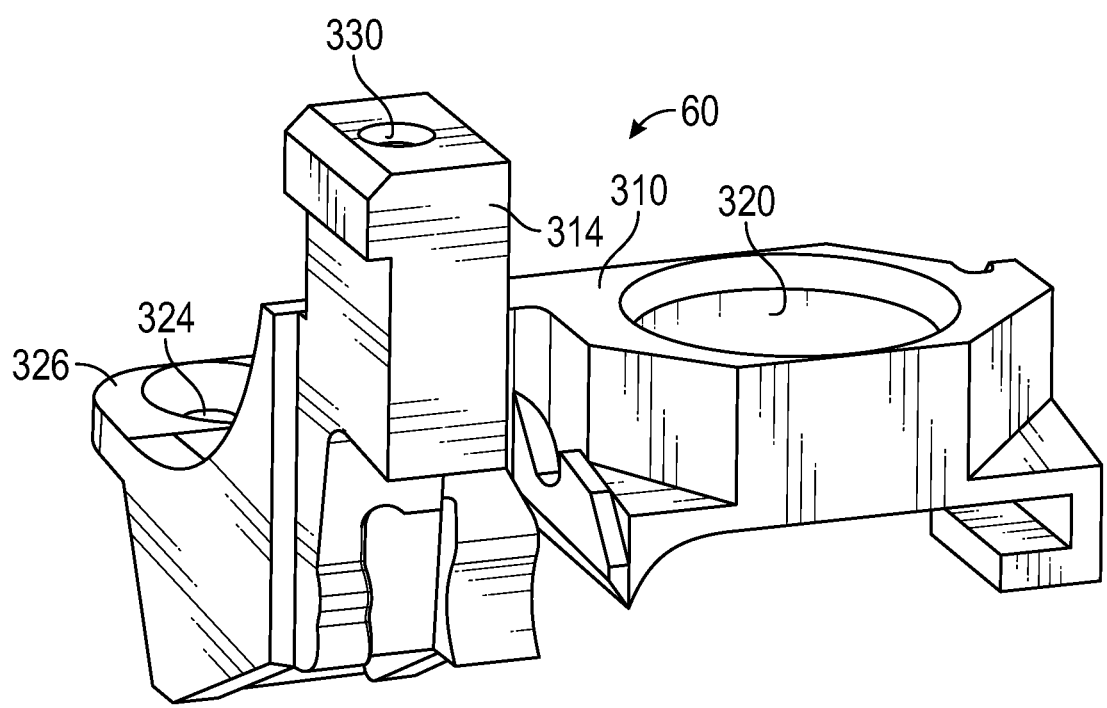
FIG. 14 is a second perspective view of the safety switch of FIG. 13.

Referring to FIGS. 13 and 14, the safety switch bracket 60 engages the BTSI 280 and the shift gate 58 or the shift gate 58'. The safety switch bracket 60 may be a plastic injection molded bracket. The safety switch bracket 60 includes a bracket body 310, an arcuate portion 312 that extends from the bracket body 310, and a mounting arm 314 that extends from the bracket body 310.

The bracket body 310 defines a bore 320 that is aligned with the second mounting hole 272 of the second tab 254 of the shift gate 58. The BTSI 280 extends through the bore 320 and the second mounting hole 272.

The arcuate portion 312 defines a slotted opening 322 and a mounting opening 324. The arcuate portion 312 includes an extension 326 that defines the mounting opening 324 such that the extension 326 is disposed between the column mounting portion 90 and the upper jacket 22. A fastener extends through the first bracket mounting hole 104 of the column mounting portion 90 and the mounting opening 324 to couple the safety switch bracket 60 to the jacket mounting bracket 50, as shown in FIG. 1.

The mounting arm 314 is disposed opposite the extension 326 of the arcuate portion 312. The mounting arm 314 extends towards and engages the BTSI 280. The mounting arm 314 defines a fastener opening 330 that receives a fastener 332 to couple the mounting arm 314 to the BTSI 280, as shown in FIG. 1.

Referring to FIGS. 1 and 3, the ball actuator assembly 62 is pivotally connected to the jacket mounting bracket 50 and the shift shaft assembly 54. The ball actuator assembly 62 includes a shift cam 340 and an actuator 342.

The shift cam 340 includes a pivot opening 350, a cam opening 352, and a mounting member 354. The pivot opening 350 is arranged to receive the shoulder bolt 132 to pivotally connect the shift cam 340 to the cradle portion 92 of the shift assembly bracket 52. The shoulder bolt 132 defines a pivot about which the shift cam 340 may pivot, responsive to rotation of the shift shaft assembly 54 about the axis 178 and the pivoting of the actuator 342 within the cam opening 352. A threaded nut 356 may be disposed about an end of the shoulder bolt 132 to secure the shift cam 340 to the cradle portion 92 of the shift assembly bracket 52.

The cam opening 352 at least partially defines a cam follower surface 360 along which a portion of the actuator 342 may ride.

The mounting member 354 extends from a surface of the shift cam 248 engages a transmission cable assembly or a control mechanism.

The actuator 342 is disposed about an end of the shaft bolt 164. The actuator 342 is secured to the shaft bolt 164 by a threaded nut 370. A wave washer 372 is disposed about the shaft bolt 164 and is disposed between the actuator 342 and the cradle portion 92. The wave washer 372 de-lashes the actuator 342. The actuator 342 includes a ball member 380 that extends into the cam opening 352 and rides along the cam follower surface 360 responsive to pivoting of the shift cam 340.

The gear shift assembly 24 of the present disclosure provides a low profile modular design while accommodating energy absorption travel during a steering column collapse event along the steering column axis 12. The gear shift assembly 24 provides the integration of components while also improving overall shift performance responsive to angulation or rotation of the shift lever and the shift clevis 56.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A steering column assembly, comprising:
    an upper jacket extending along a steering column axis; and
    a gear shift assembly, comprising:
        a shift assembly bracket having a column mounting portion operatively connected to the upper jacket and a cradle portion extending from the column mounting portion, the cradle portion being a U-shaped portion formed by a first sidewall and a second sidewall extending from a base, the first sidewall and the second sidewall each extending substantially perpendicularly from the base, the first sidewall extends from an end of the column mounting portion;
        a shift shaft assembly having a first end extending through a first aperture defined within the first sidewall and having a second end extending through a second aperture defined by the second sidewall, wherein the shift shaft assembly is spaced apart from the base of the cradle; and
        a cable mounting portion having a planar portion, an angled portion and a cable cradle portion, the planar portion extending from the second sidewall and oriented perpendicularly thereto, the angled portion extending away from the planar portion at a non-parallel angle relative to the planar portion and away from the upper jacket, and the cable cradle portion extending away at a non-parallel angle relative to the angled portion and toward the upper jacket.

2. The steering column assembly of claim 1, wherein the shift assembly bracket includes an arm that extends from the base.

3. The steering column assembly of claim 2, wherein the shift assembly bracket defines a bore proximate a junction between the arm and the base.

4. The steering column assembly of claim 2, wherein the column mounting portion includes an angled tab that is disposed parallel to the arm.

5. The steering column assembly of claim 2, wherein the shift shaft assembly includes a shifter cup that is disposed adjacent to the first sidewall and a shaft member that extends between the first sidewall and the second sidewall.

6. The steering column assembly of claim 5, wherein the shifter cup is operatively connected to the shaft member by a shaft bolt that extends through the shifter cup and the shaft member.

7. The steering column assembly of claim 6, wherein the shifter cup includes a cup base defining an opening through which the shaft bolt extends and first and second curved sidewalls extending from the cup base.

8. A gear shift assembly provided with a steering column assembly, the gear shift assembly, comprising:
    a shift assembly bracket, comprising:
        a column mounting portion,
        a cradle portion being a U-shaped portion formed by a base, a first sidewall that extends from the column mounting portion and the base, and a second sidewall extending from the base, the first sidewall and the second sidewall each extending substantially perpendicularly from the base, and
        a cable mounting portion extending from the second sidewall, the cable mounting portion having a planar portion, an angled portion and a cable cradle portion the planar portion extending from the second sidewall and oriented perpendicularly thereto, the angled portion extending away from the planar portion at a non-parallel angle relative to the planar portion, and the cable cradle portion extending away at a non-parallel angle relative to the angled portion; and
    a shift shaft assembly, comprising:
        a shaft member having a first end that extends through a first aperture defined within the first sidewall and having a second end that extends through a second aperture defined within the second sidewall, and
        a shifter cup disposed adjacent to the first sidewall.

* * * * *